United States Patent [19]

Sakakibara

[11] Patent Number: 4,630,723
[45] Date of Patent: Dec. 23, 1986

[54] CENTRIFUGAL TYPE FRICTION CLUTCH

[75] Inventor: Shiro Sakakibara, Anjo, Japan

[73] Assignee: Aisin-Warner Limited, Anjo, Japan

[21] Appl. No.: 652,479

[22] Filed: Sep. 20, 1984

[30] Foreign Application Priority Data

Sep. 22, 1983 [JP] Japan ................................ 58-175784

[51] Int. Cl.$^4$ ............................................. F16D 43/14
[52] U.S. Cl. ............................... 192/105 BA; 192/3.31
[58] Field of Search ................... 192/105 BA, 105 CE, 192/3.31

[56] References Cited

U.S. PATENT DOCUMENTS 4,305,493  12/1981  Silberschlag ................. 192/105 BA
4,383,596  5/1983   Jackel ........................ 192/105 BA

FOREIGN PATENT DOCUMENTS 2019958  11/1979  United Kingdom ......... 192/105 BA

Primary Examiner—George H. Krizmanich
Attorney, Agent, or Firm—Pahl, Lorusso & Loud

[57] ABSTRACT

A centrifugal type friction clutch for motor vehicles, which include: a disk serving as an output member and provided with a number of frictional coupling element support means in outer peripheral portions thereof; a drum serving as an input member and provided with a frictional coupling surface on the inner periphery thereof in coaxial relation with the circumference of the disk; and frictional coupling elements respectively supported by the frictional coupling element support means and displaceable radially outward according to the rotational speed of the disk for engagement with frictional coupling surface on the drum. The frictional coupling elements include: a friction shoe having an arcuate portion with a frictional coupling surface on the outer side thereof and abutting portions at radially inwardly projected end portions on the opposite sides of the arcuate portion; a weight having the opposite ends thereof engaged with the abutting portions of the arcuate portion; a resilient load means located between the weight and friction shoe and urging these members away from each other; and a resilient retracting means having the opposite ends thereof engaged with the frictional coupling element support means and an intermediate portion abutted against the weight; the friction shoe having one of the abutting portions engaged with one of the projections on the disk to serve as trailing shoe in driven power transmission and as a leading shoe in drive power transmission.

1 Claim, 14 Drawing Figures

CENTRIFUGAL TYPE FRICTION CLUTCH

BACKGROUND OF THE INVENTION

1. Field of the Invention

This invention relates to a centrifugal type friction clutch for a transmission which permits power to be transmitted in either direction, for example, power transmission from an input member to an output member (engine drive) and power transmission from the output member to the input member (engine brake) of a motor vehicle.

2. Description of the Prior Art

It is known in the art that slipping of a clutch is effective for reducing vibrations and noises which occur a high load in a motor vehicle with a centrifugal type friction clutch. Clutch slippage reduces the torsional vibrations caused by variations in torque which are applied to the drive system of the vehicle by the reciprocating mass of a driving piston as a result of detonations (knocking) in the engine cylinder. In this connection, U.S. Pat. No. 4,305,493 proposes a centrifugal type friction clutch which includes, as shown in FIGS. 1 to 5, slidable friction shoes 40 each having an engaging portion and C-shaped opposite end portions which are bent inward, a follower member 50 held by guides at its opposite ends, a leaf-like load spring 60 provided between the follower member 50 and friction shoe 40 and a retractor spring 80 positioned between the load spring 60 and follower member 50 and engaged at opposite ends with paired projections 70 provided on the disc 10.

This centrifugal friction clutch operates in the following manner:

(a) Low-speed non-operating range (FIG. 1)

The friction shoe 40 against the paired projections 70, and forms at one end of the load spring 60, a leading contact portion 40A in power transmission in driving state (hereinafter referred to as "drive power transmission" for brevity) and at the other end a leading contact portion 40B in power transmission in driven state (hereinafter referred to as "driven power transmission).

(b) Low-speed operating range (FIG. 2)

The engaging portion of the friction shoe 40 is displaced radially outward and held in engagement with the opposing friction surface of the drum 20.

(c) Medium- and low-speed centrifugal clutch range (FIG. 3)

The friction shoe 40, follower member 50 and retractor spring 80 are urged toward the drum 20, and the friction shoe 40 and follower member 50 are separated from each other.

(d) Medium- and high-speed torque limiter range (FIG. 4)

Opposite ends of the retractor spring 80 are abutted against the follower member 50, and the friction shoe 40 and follower member 50 are separated from each other.

(e) High-speed range (FIG. 5)

The load limiting spring 60 and retractor spring 80 are separated from each other, and the engaging portion of the friction shoe 40 is held in engagement with the drum 20 solely by the centrifugal force.

When a centrifugal friction clutch of such a construction is used on a motor vehicle, it is possible to slip the clutch only in drive power transmission upon application of a large load since the friction shoe 40 serves as a leading shoe in both drive and driven states. However, although the clutch slip is necessary at a smaller load in a driven power transmission than in a drive power transmission, it has been difficult to comply to this requirement, failing to reduce the torsional vibrations during an engine-braked cruising operation for suppression of vibrations and noises of a vehicle.

SUMMARY OF THE INVENTION

It is an object of the present invention to provide a centrifugal type friction clutch employing friction shoes which are adapted to serve as a leading shoe in drive power transmission and as a trailing shoe in driven power transmission, namely, which permits clutch slipping in both modes, according to the amount of load, to absorb torsional vibrations of the drive system of a vehicle and thereby suppress vibrations and noises.

More particularly, the present invention concerns a centrifugal friction clutch for motor vehicles, which clutch essentially includes: a disk serving as an output member and provided with a number of friction element support means in an outer peripheral portion thereof; a drum serving as an input member and provided with a frictional coupling surface on the inner periphery thereof in coaxial relation with the circumference of the disk; and frictional coupling elements respectively supported by the friction element support means and displaceable radially outward according to the rotational speed of the disk for engagement with the frictional coupling surface of the drum. The frictional coupling elements each include a friction shoe having an arcuate portion with a frictional coupling surface on the outer side thereof and abutting portions provided at inwardly projected end portions on opposite sides of the arcuate portion, a weight having the opposite ends thereof engaged with the abutting portions of the arcuate portion, a resilient load means located between the weight and friction shoe and urging the these two members away from each other, and a resilient retracting means having the opposite ends thereof engaged with the frictional coupling element support means and an intermediate portion abutted against the weight.

With the above-described construction, the centrifugal friction clutch of the invention provides clutch slip, even in a driven power (e.g., engine braking) mode, to reduce torsional oscillations of a drive train which has a large influence on the vibrations and noises in a vehicle.

The above and other objects, features and advantages of the invention will become apparent from the following description and appended claims, taken in conjunction with the accompanying drawings which show by way of example a preferred embodiment of the invention.

DESCRIPTION OF PREFERRED EMBODIMENTS

Now, the invention is described more particularly by way of a preferred embodiment shown in FIGS. 6 through 14. In the particular embodiment shown, the centrifugal friction clutch of the invention is used as a direct coupling clutch of a fluid type torque converter.

Figure 1:
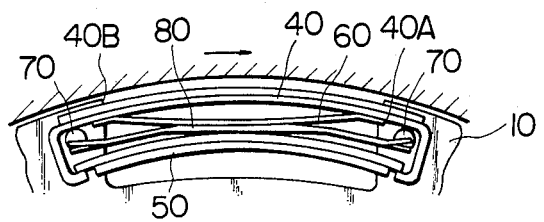
FIG. 1 through 5 are front views of a conventional centrifugal type friction clutch.
Figure 2:
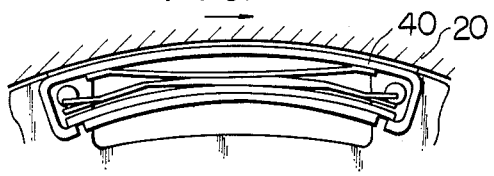
Figure 3:
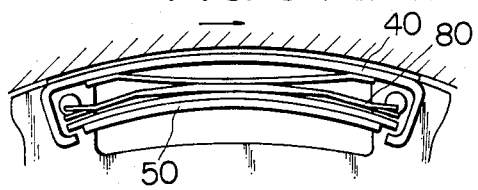
Figure 4:
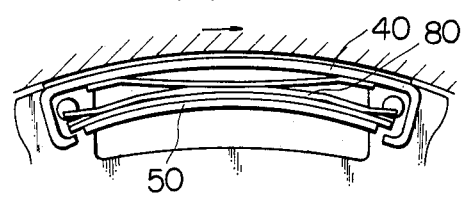
Figure 5:
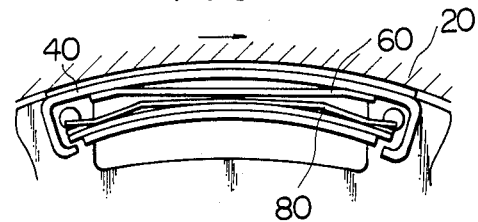
Figure 6:
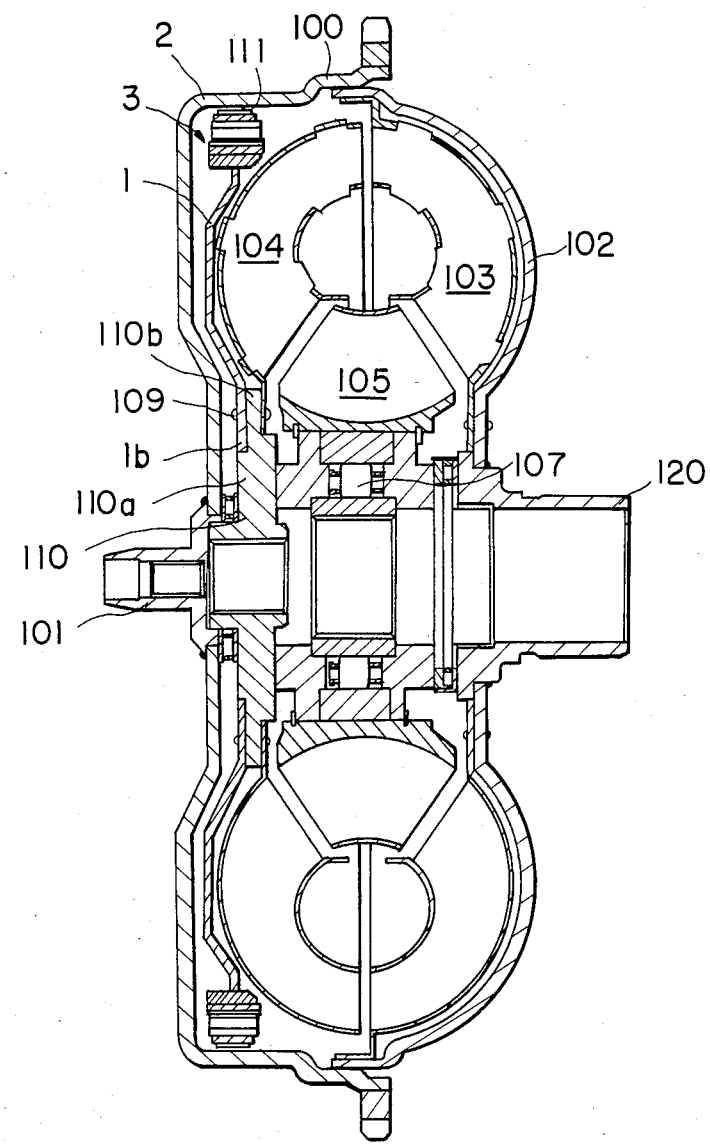
FIG. 6 is a sectional view of a torque converter incorporating a centrifugal type friction clutch according to the present invention.

Referring to FIG. 6, there is shown in section a torque converter incorporating a centrifugal friction clutch according to the invention, in which: indicated at 100 is a front cover serving as an input member and centrally provided with an input shaft 101; at 102 a rear cover having its outer periphery welded to the front cover 100 and internally provided with a pump impeller 103; at 104 a turbine runner provided in the front cover 100 rotatable in a direction opposite to the rotation of the pump impeller 103; at 105 a stator connected to a stationary part through a one-way clutch 107; and at 110 a turbine hub having its outer edge 110a in fitted in the inner edge 1b of an axially slidable disk which will be described in detail hereinlater, and its outer periphery 110b fastened to the inner peripheries of centrifugal clutch disk and turbine runner 104 by pins 109.

Figure 7:
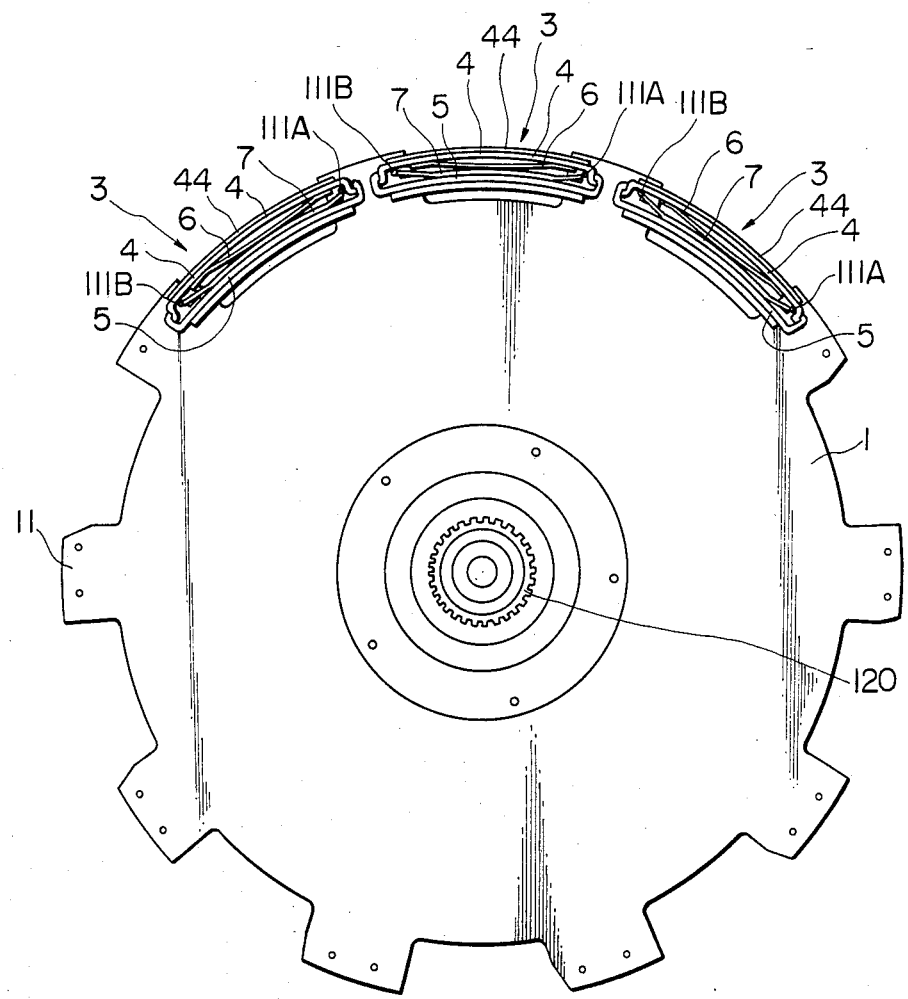
FIG. 7 is a front view of a disk employed in the centrifugal type friction clutch of the invention.

Designated at 1 is, referring to FIG. 7, the centrifugal clutch disk in the form of an annular plate, which is located between the cover 100 and turbine runner 104 and provided with a plural number of paired projections 111A and 111B at uniform intervals in outer peripheral portions of radial projections 11 to serve as frictional coupling element support means, and frictional coupling elements which are displaceable radially outward according to the rotational speed of the disk for engagement with a frictional coupling surface 111 on a drum portion 2 of the front cover 100 and the paired projections 111A and 111B in the manner as will be described hereinlater. The reference numeral 120 denotes the output shaft of the torque converter.

Figure 10:
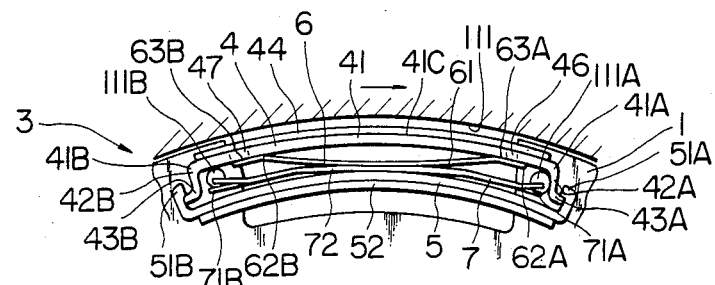
FIGS. 10 through 14 are views explanatory of the operations by the frictional coupling elements in the centrifugal type friction clutch of the invention.

Designated at 3 are, referring to FIG. 10, frictional coupling elements which include: a friction shoe including an arcuate portion 41 located on the outer sides of the paired projections 111A and 111B of the centrifugal clutch disk 1 and having a frictional coupling surface 41C on the outer side thereof and abutting portions 42A and 42B which project radially inward from the opposite ends 41A and 41B of the arcuate portion 41. As shown in FIGS. 10-14, abutting portion 42A engages projection 111A and the abutting portion 42B is spaced from the projection 111B (disengaged). The radially inner ends of the abutting portions 42A and 42B are bent to extend in the circumferential direction to form abutting tip end portions 43A and 43B. A friction material 44 provided on the outer surface of the arcuate portion 41. A weight includes inwardly bent portions 51A and 51B which engage the outer surfaces of the tip end portions 43A and 43B of the friction shoe 4, and an arcuate follower weight 52 located on the inner side of the paired projections 111A and 111B is held in parallel relation with the weight body. A load spring 6 located between the weight 5 and friction shoe 4 urges these two members apart and is radially inwardly curved in its center portion 61 and provided with contact portions 63A and 63B at its opposite ends 62A and 62B for engagement with the friction shoe 4. A retractor spring 7 engages with the paired projections 111A and 111B at its opposite ends 71A and 71B and abutts against the weight 5 at its center portion 72.

Figure 8:
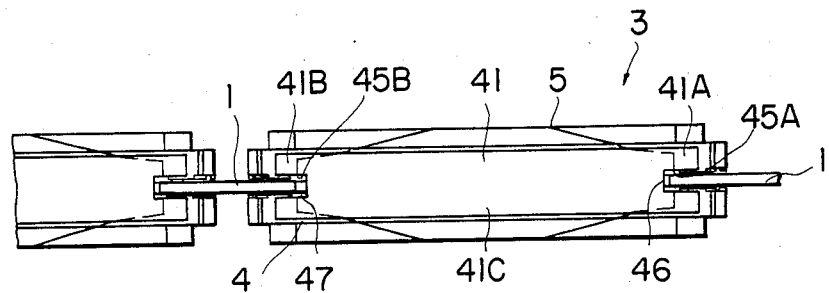
FIG. 8 is a side view of frictional coupling elements employed in the centrifugal type friction clutch of the invention.

As shown in FIG. 8, a groove 45A which is formed at one end 41A of the arcuate portion 41 of the friction shoe 4 for gripping the disk 1 serves as a leading contact portion 46 in drive power transmission in which a groove 45B at the other end 41B forms a clearance 47 between the disk 1 and friction shoe 4. In this instance, the frictional coupling surface 41C is engaged with the frictional coupling surface 111 on the coaxial drum portion 2 of the front cover 100.

Now, the operation of the clutch according to the invention is described with reference to FIGS. 9 to 14.

Figure 9:
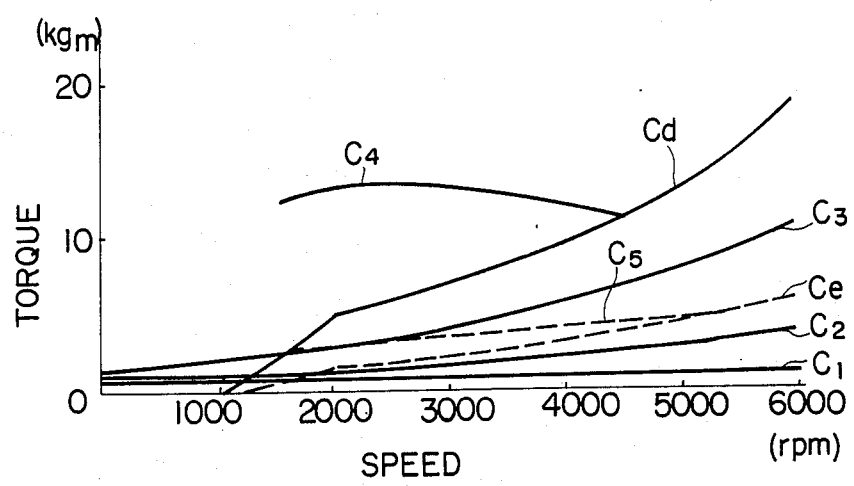
FIG. 9 is a torque capacity diagram of the centrifugal type friction clutch according to the invention.

Referring to the torque capacity diagram of FIG. 9, the clutch torque capacity in drive power transmission (lock-up torque curve) is indicated by a characteristics curve Cd, while the clutch torque capacity in driven power transmission is indicated by a characteristics curve Ce. On the other hand, the required torque capacities in first, second, third (road load), maximum engine drive (engine torque) and maximum engine brake are plotted by characteristics curves C1 to C5, respectively.

(a) FIG. 10 shows the position in the low-speed non-operating range (e.g., in a range where the disk 1 is at a rotational speed lower than 600 r.p.m.).

In this position, the friction shoe 4 and retractor spring 7 are abutted against the paired projections 111A and 111B, and the weight 5 is abutted against the distal end portions 43A and 43B of the abutting portions 42A and 42B of the friction shoe 4, the load spring 6 acting to separate the friction shoe 4, weight 5 and retractor spring 7 from each other. In this case, the torque converter operates normally.

Figure 11:
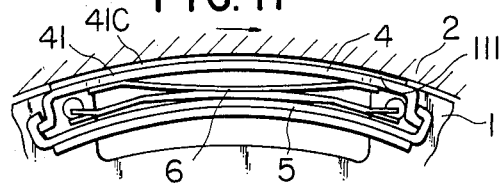

(b) FIG. 11 shows the position in the low-speed operating range (e.g., a range where the disk 1 is at a rotational speed of 600 to 1000 r.p.m.).

The arcuate portion 41 providing the frictional coupling surface 41C of the shoe 4 is in engaged with the friction surface 111 on the drum portion 2 of the front cover 100, and the load spring 6 urges the friction shoe 4 and weight 5 away from each other.

Figure 12:
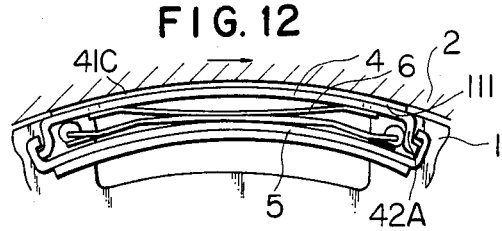

(c) FIG. 12 shows a medium speed centrifugal clutch range (e.g., a range where the disk 1 is at a rotational speed of 1000 to 2000 r.p.m).

The load spring 6 is displaced radially outward from the position of FIG. 11 to separate the weight 5 and friction shoe 4 from each other.

The load spring 6 and weight 5 increase the rotation by engagement between the friction surface 41C of the shoe 4 and the friction surface 111 on the drum portion 2 of the front cover 100 by the leading contact portion in driving power transmission. This is indicated by the torque capacity Cd in driving power transmission. When starting a vehicle, the power transmission is started gradually from an engine speed of around 1000 r.p.m. imparting the torque capacity Cd to the clutch in driving power transmission at a speed higher than about 1500 r.p.m. to transmit the engine torque perfectly.

As a result, it becomes possible to start a vehicle smoothly and at the same time to prevent excessive slipping. Besides, the clutch is completely disconnected during a shift operation and, upon completion of a shift operation, it is connected smoothly according to various operating conditions, while guaranteeing the engine brake effect at low speeds by the one-way clutch 107. In driving power transmission, the centrifugal friction clutch has a torque capacity Cd, which is proportiomal to the square of the rotational speed, to ensure smooth vehicle starts.

Figure 13:
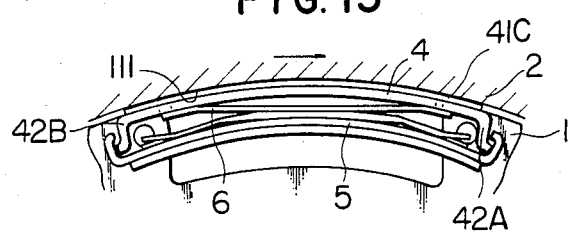

(d) FIG. 13 shows a medium/high speed torque limiter range (e.g., a range where the disk 1 is at a rotational speed of 2000 to 5000 r.p.m.).

In this range, the force of frictional engagement between the friction surface 41C of the shoe 4 and the friction surface 111 on the drum portion 2 of the front cover 100 is determined by the friction shoe 4 and the biasing force of the load spring in response to increases in rotational speed. The load spring 6 urges the weight 5 to bend outward, disengaging from the abutting portions 42A and 42B of the friction shoe 4. The torque capacity Cd of the clutch in driving power transmission becomes greater than the engine torque C4 at a speed higher than 4500 r.p.m. The friction shoe 4 becomes a trailing shoe in driven power transmission, so that the torque capacity Ce of the clutch in driven power transmission becomes smaller than the torque capacity Ce of the clutch in driving power transmission by about ⅓.

Figure 14:
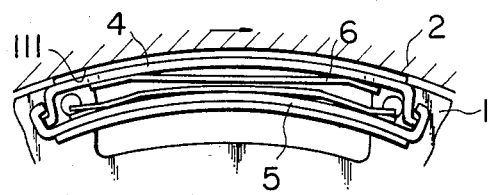

FIG. 14 shows a high speed range (e.g., a range where the disk 1 is at a rotational speed higher than 5000 r.p.m.). The load spring 6 stops biasing of the friction shoe 4 and weight 5, so that the friction shoe 4 is engaged with the friction surface 111 on the drum portion 2 of the front cover 100 solely by the centrifugal force to permit slipping of the clutch. Namely, the torque capacity Ce of the clutch in driven power transmission is reduced (by about ⅓) as compared with the torque capacity Cd of the clutch in drive power transmission to slip the clutch according to the load level even in driven power transmission. Thus, the centrifugal friction clutch of the present invention is constructed to permit slipping of the clutch also in driven power transmission according to the load level to reduce the torsional vibrations of the drive system which will lead to vibrations and noises of a vehicle.

Although the centrifugal friction clutch of the invention is applied as a direct coupling clutch of a fluid type torque converter in the foregoing embodiment, it can also be used as a centrifugal friction clutch for a fluid coupling or the like. Needless to say, it can also be applied to other starting mechanisms.

It will be appreciated from rhe foregoing description that the centrifugal type friction clutch of the present invention is arranged to use the friction shoes as leading shoes in drive power transmission and as trailing shoes in driven power tranmission, reducing the torque capacity of the clutch in driven power transmission by about ⅓ as compared with that in power transmission in driven state for reducing the torsional vibrations of the drive system, which effect vibrations and noises of the vehicle.

What is claimed is:

1. A centrifugal type friction clutch which permits clutch slipping in both drive power transmission and driven power transmission modes, said clutch having a torque capacity in driven power transmission less than that in drive power transmision and comprising:

a drum having an interior cylindrical surface serving as a frictional coupling surface;

a disk coaxially mounted within said drum, said disk having a plurality of radial projections, said radial projections radially extending from the periphery of said disk and defining a plurality of peripheral notches therebetween, each of said radial projections having a pair of axially extending stop members mounted thereon;

a plurality of frictional coupling elements, one of said coupling elements mounted in each of said notches for radial movement therein, each of said frictional coupling elements comprising:

an arcuate portion with a friction surface for engaging said frictional coupling surface of said drum;

a pair of arms integral with said arcuate portion and extending radially inward from opposite ends of said arcuate portion, one of said arms engaging one of said radial projections in the driven power transmission mode, whereby the frictional coupling element becomes a trailing element;

a pair of grooves, one groove formed in each end of said frictional coupling element and extending into said arcuate portion, each of said grooves receiving an edge portion of an adjacent radial projection, the bottom of the groove extending through said one arm providing a point of contact with said disk in the drive power transmission mode, whereby the frictional coupling element becomes a leading element;

a plurality of weights, one of said weights mounted in each of said notches radially inward of said axially extending stop members and having arm portions extending circumferentially beyond said axially extending stop members so that the extent of the radially outward movement of the weight is limited by said axially extending stop members;

a plurality of resilient load elements, one of said resilient load elements mounted in each of said notches, said one resilient load element located between and urging apart one of said weights and one of said frictional coupling elements; and a plurality of resilient retracting elements, each of said resilient retracting elements having end portions, each of said end portions engaging an axially extending stop member and having an intermediate portion engaging a weight so as to urge the weight radially inward.

* * * * *